United States Patent
Chirila et al.

(10) Patent No.: US 10,331,792 B1
(45) Date of Patent: Jun. 25, 2019

(54) LOCALIZATION OF EMBEDDED DATABASES

(71) Applicant: TG Inc, Los Altos, CA (US)

(72) Inventors: Sergiu Chirila, Martinez, CA (US); Stanton Kee Nethery, Sebastopol, CA (US)

(73) Assignee: TG Inc, Berkeley, CA (US)

( * ) Notice: Subject to any disclaimer, the term of this patent is extended or adjusted under 35 U.S.C. 154(b) by 0 days.

(21) Appl. No.: 15/673,424

(22) Filed: Aug. 10, 2017

Related U.S. Application Data

(63) Continuation of application No. 14/887,284, filed on Oct. 19, 2015.

(60) Provisional application No. 62/065,717, filed on Oct. 19, 2015.

(51) Int. Cl.
| | | |
|---|---|---|
| *G06F 17/00* | (2019.01) | |
| *G06F 17/28* | (2006.01) | |
| *G06F 16/33* | (2019.01) | |

(52) U.S. Cl.
CPC ...... *G06F 17/2836* (2013.01); *G06F 16/3344* (2019.01)

(58) Field of Classification Search
CPC .... G06F 17/2854; G06F 17/28; G06F 9/4448; G06F 17/211; G06F 17/243; G06F 17/246; G09B 19/06
See application file for complete search history.

(56) References Cited

U.S. PATENT DOCUMENTS

| | | | | |
|---|---|---|---|---|
| 5,678,039 | A  * | 10/1997 | Hinks | G06F 9/454 |
| 6,182,062 | B1 * | 1/2001 | Fujisawa | G06F 17/271 |
| RE37,722 | E  * | 5/2002 | Burnard | G06F 9/454 |
| | | | | 713/1 |
| 7,711,544 | B2 * | 5/2010 | McEntee | G06F 17/248 |
| | | | | 704/2 |
| 7,797,151 | B2 * | 9/2010 | Apte | G06F 9/454 |
| | | | | 704/8 |
| 8,126,702 | B2 * | 2/2012 | Lang | G06F 17/2836 |
| | | | | 704/8 |
| 8,972,433 | B2 * | 3/2015 | McLean | G06F 16/8358 |
| | | | | 707/760 |
| 9,152,690 | B2 * | 10/2015 | Xue | G06F 16/284 |
| 2002/0177993 | A1 * | 11/2002 | Veditz | G06F 17/2205 |
| | | | | 704/8 |
| 2003/0009323 | A1 * | 1/2003 | Adeli | G06F 9/454 |
| | | | | 704/8 |
| 2004/0111254 | A1 * | 6/2004 | Gogel | G06F 9/454 |
| | | | | 704/8 |
| 2006/0156278 | A1 * | 7/2006 | Reager | G06F 9/454 |
| | | | | 717/104 |

(Continued)

*Primary Examiner* — Edgar X Guerra-Erazo

(57) ABSTRACT

This Application relates to localization of embedded databases in an "app": translation of language text, units of measure, and other matters; determining and extracting data from word and phrase translation databases (translation tables) in the app; presenting translated display pages to a (human or machine) translator, the latter translating the words or phrases as they appear in the context of the presented page; inserting the translated words and phrases into the translation tables, wherein the app uses them in their translation table format. Embodiments can be applied to translating words or phrases into equivalent meaning in a different language, or in the same language but suited to a different audience.

19 Claims, 2 Drawing Sheets

(56) References Cited

U.S. PATENT DOCUMENTS

| | | | |
|---|---|---|---|
| 2008/0189096 A1* | 8/2008 | Apte | G06F 9/454 |
| | | | 704/2 |
| 2009/0192783 A1* | 7/2009 | Jurach, Jr. | G06F 17/2827 |
| | | | 704/4 |
| 2013/0226554 A1* | 8/2013 | Dillard | G06F 17/289 |
| | | | 704/2 |
| 2014/0244680 A1* | 8/2014 | Chandran | G06F 16/2452 |
| | | | 707/760 |

* cited by examiner

Method 200

LOCALIZATION OF EMBEDDED DATABASES

RELATED DOCUMENTS

This Application describes technologies that can be used with inventions, devices, methods, and techniques, and other technologies, including those described in one or more of the following documents, and any documents quoted therein or related thereto.

Each of these Applications is assigned to the same assignee.

- U.S. Provisional Application 61/873,616, filed Sep. 4, 2013, in the name of Vicki Thomas, titled "Translation in visual context,";
- U.S. application Ser. No. 14/477,838, filed Sep. 4, 2014, in the name of Vicki Thomas, titled "Translation in visual context,";
- U.S. Provisional Application 61/873,678, filed Sep. 4, 2013, in the name of Stanton Kee Nethery III, titled "User corrections of translation,";
- U.S. Provisional application Ser. No. 14/477,842, filed Sep. 4, 2014, in the name of Stanton Kee Nethery III, titled "User corrections of translation,";
- U.S. Provisional Application 61/873,673, filed Sep. 4, 2013, in the name of Vicki Thomas, titled "Translation under constraints,";
- U.S. application Ser. No. 14/477,845, filed Sep. 4, 2014, in the name of Vicki Thomas, titled "Translation under constraints,";
- U.S. Provisional Application 61/873,665, filed Sep. 4, 2013, in the name of Stanton Kee Nethery III, titled "Translation on demand,";
- U.S. application Ser. No. 14/477,847, filed Sep. 4, 2014, in the name of Stanton Kee Nethery III, titled "Translation on demand,";
- U.S. Provisional Application 61/928,918, filed Jan. 17, 2014, in the name of Eric Choate, titled "Converting programs to visual representation with reading compiled binary,";
- U.S. application Ser. No. 14/600,922, filed Jan. 20, 2015 (Tuesday, the day after Martin Luther King, Jr. Day, a federal holiday), in the name of Eric Choate, titled "Converting programs to visual representation with reading compiled binary,";
- U.S. Provisional Application 61/928,927, filed Jan. 17, 2014, in the name of Eric Choate, titled "Converting programs to visual representation with intercepting screen draws,";
- U.S. application Ser. No. 14/600,942, filed Jan. 20, 2015 (Tuesday, the day after Martin Luther King, Jr. Day, a federal holiday), in the name of Eric Choate, titled "Converting programs to visual representation with intercepting screen draws,";
- U.S. Provisional Application 62/065,717, filed Oct. 19, 2014, in the name of Sergiu Chirala and Stanton Kee Nethery II, titled "Localization of embedded databases,";
- U.S. Provisional Application 62/152,968, filed Apr. 26, 2015, in the name of Sergiu Chirala and Stanton Kee Nethery II, titled "Automated capture of application user interfaces,";

Each and every one of these documents, as well as all documents cited therein, is hereby incorporated by reference as if fully recited herein.

This Application claims priority of each and every one of these documents, as well as to all documents incorporated therein, to the fullest extent possible.

BACKGROUND

Field of the Disclosure

This application relates to localization of embedded databases in an application program (an "app"), including translation of language text, and other matters.

For example, this application includes information relating to altering language text from a first natural language to text having an equivalent meaning in a second natural language (such as from English to Spanish).

Other and further possibilities are described herein.

Related Art

The computing power of some mobile devices (such as smartphones and other hand-held devices; as well as wearable, implantable, and other devices) makes it possible to write programs of instructions for those devices that display information in various different ways. These include text, drawings, still photos, animation, movies, or otherwise. These programs of instructions are sometimes referred to as "applications," or "apps."

At least one problem that has arisen is that the text, drawings, still photos, animation, movies (and otherwise) have human meanings in one location, or to one particular group of users; that require different text, drawings, still photos, animation, movies (and otherwise) to have the same human meanings in different locations, or to different groups of users.

For example, to achieve the same human meaning as text in a first natural language (such as English), typically involves different text in a second natural language (such as Spanish or Mandarin). This similarly applies to symbols, drawings, still pictures, animation, movies, and other information understandable by users; sometimes collectively referred to herein as "displayable media." Inclusion of one or more items of displayable media can lead to the problem of a difference in meaning between what the programmer intends that displayable media to mean, and what the user understands that displayable media to mean.

One known solution is to include different collections of versions of the displayable media, such as an English version, a Spanish version, a Mandarin version, each to be used by different sets of users. In such cases, the app could be written with the one or more items of displayable media being in a language most easily understood by the programmer, with translations of those one or more items of displayable media being inserted later by other programmers, or by translators, with better knowledge of other languages. This is sometimes referred to as "internationalization" or "localization," in which a single program of instructions provides text and figures in multiple languages, as well as settings that determine in what language to display the text, is collected in a standardized data structure. These settings can be fixed by the programmer, can be fixed at an initialization time by the program of instructions, or can be alterable by users from time to time. Localization is typically performed for text, with one or more other items of displayable media being maintained by the app in separate project folders, such as "en.lproj" for English, "es.lproj" for Spanish, and otherwise, with different displayable media associated with each different language, but it is possible to identify particular separate colors, pictures, textures, or otherwise, with each particular separate language.

However, this known solution can be subject to some drawbacks. If the app has not yet been localized (that is, localization has been performed on the app), or even if the app has been localized for only a particular set of languages, and it is desirable to localize the app, or to change its localization, or to add new languages to its localization, it can be difficult to identify where the app maintains its one or more localization databases (if there are any such localization databases at all). Having identified where the app maintains its one or more localization databases, it can be difficult to identify which particular one or more items of displayable media should be changed or added-to. Having identified which particular displayable media should be changed or added-to, it can be difficult, particularly when the original programmers are not available, to determine what changes or additions to make. Having determined what changes or additions to make, it can be difficult to properly insert one or more new items of displayable media (such as translated text) into the app's one or more localization databases, so that the new displayable media can be used by the app in the original format used by its one or more localization databases.

Some Drawbacks of the Known Art

Each of these issues, as well as other possible considerations, might cause difficulty in aspects of creating and maintaining apps that are designed, or otherwise, for different languages. Moreover, each of these problems are associated with a decision under uncertainty (such as, what particular displayable media has the meaning intended by the programmer) that, if erroneous, can degrade the value of the app in newly-added languages.

BRIEF SUMMARY

This Application

This Application provides patentable subject matter that can ameliorate at least some of the problems described above, as well as others.

In possible implementations, this Application provides apparatuses and techniques that enable relatively easier translation of natural languages.

Other and further subject matter is also described.

Devices and Methods of Use

In one embodiment, a system includes apparatuses that determine and extract data from word and phrase localization databases (such as internationalization, localization, or translation tables) in the app, so that it can add localization from a source natural language to an additional target natural language. The system rewrites program elements that include displayable media (or generate new program elements that include displayable media) from a primary form they have in the app, into a secondary form, the secondary form being suitable for presentation to a translator. The translator, such as a human translator, a machine translator, or a combination or conjunction thereof, observes the context of the displayable media as it would be viewed by the user, and can use information from that context (possibly along with the information from the particular displayable media and information from other displayable media used by the app), to select displayable media associated with the target natural language, that has nearly identical (or at least, similar) human meaning as the source natural language.

In one embodiment, the system, in combination or conjunction with other devices, with users, and/or otherwise, performs a method of its capabilities. The method identifies those localization databases in the app, possibly including identifying the source natural language (or languages, if there are more than one), such as in response to the nature they are expected to have, such as SQL databases. The method rewrites program elements from the primary form described herein, into a secondary form, such as by creating program elements that would otherwise generate SQL databases in a spreadsheet format or a human-readable text format. The method sends the secondary form to a translator directly, inserts the secondary form into a web page to be presented to a translator, inserts the secondary form into another data structure that can be presented to a translator at another device, or otherwise. The translator observes the displayable media, and in response to the context of that displayable media, and of course their knowledge of the source natural language and the target natural language, selects displayable media from the target natural language to be inserted into the localization database. The method receives the one or more selections made by the translator, rewrite those selections from the secondary form into program elements in the primary form, and in response to those program elements in the primary form, generate a new localization database with the selections from the translator.

In one embodiment, the system includes one or more devices, such as a first device on which the app is written, the first device possibly including a development environment for the app, a second device on which the app is performed, the second device possibly including one or more mobile devices such as described herein (or the second device being emulated by the development environment for the app), and a third device at which the translator observes the app and selects displayable media from the target natural language, the third device possibly including a relatively standard computing device (such as a desktop, laptop, tablet or phablet or other mobile device), possibly modified with a translator environment to perform the functions described herein (or the third device receiving displayable media in an order the app would present that displayable media, from the first device or second device). Each of these devices includes one or more parts that operate in conjunction, is emulated (such as by or on a virtual machine), cooperates with external devices (such as language databases or other server devices), communicates with one or more operators to receive requests and respond thereto, such as to receive setting or report status, or otherwise.

Other and further details are described herein.

Possible Applicability

After reading this Application, those skilled in the art would recognize that techniques shown herein are applicable to more than just the specific embodiments shown herein, are within the scope and spirit of the invention, and would not require undue experiment or further invention.

For example, while this Application primarily describes embodiments with respect to different natural languages, in the context of the invention, there is no particular requirement for any such particular limitation. For example, Some particular implementations could include one or more of the following, or otherwise:

Translation between a natural language and an artificial language, the latter possibly including a constructed language (sometimes referred to as a "conlang") such as Esperanto, Klingon, Nav'i, Quenya, or otherwise.

Translation between a natural language (as a source natural language) and the same natural language (as a target natural language), but suited to a different audience. An example includes translation between dialects of the same natural language. Another example includes translation between more complex and more simple versions of the same natural language, or between material including relatively more versus relatively fewer technical references and jargon, such as between professional journals and popular articles. Another example includes translation between a relatively higher reading level and a relatively lower reading level, such as to make written material available for children or otherwise for a wider audience. Another example includes translation between versions including parentally-controlled words and a set of child-appropriate words.

Translation between a natural language (as a source natural language) and the same natural language (as a target natural language), but with changes in style. An example includes translation between relatively more specific and relatively more vague language. Another example includes translation between relatively more bland and relatively more descriptive style. Another example includes translation between one style of writing (detective fiction) and another style of writing (coming-of-age novels). Another example includes translation between a style of one author (Jane Austen) and another author (H.P. Lovecraft).

Translation between one natural language (as a source natural language) and the same or another natural language (as a target natural language), but with changes in style. An example includes removing or altering onomatopoeia, such as the words used for animal sounds in natural languages. Another example includes translating cultural and/or religious references.

Translation between units of measure, such as between English units and metric units, such as between word descriptions of numbers ("one trillion") and scientific notation ($1\times10^{12}$).

Translation between equivalent amounts in different currencies (US dollars, Canadian dollars, UK pounds, EU Euros, Japanese Yen, and otherwise), possibly at designated times, such as exchange rates common in the 1980's versus those common today. Similarly, translation between different amounts of money (such as millions of dollars versus thousands of dollars), when the nature of the story, or the year setting, calls for it.

Translation between equivalent dates in different calendar systems, such as the Gregorian calendar, the Islamic calendar, or the Chinese or Japanese calendars.

Examples described herein are not intended to be limiting in any way. Combinations of these examples, with or without translation between different natural languages, are also possible.

After reading this application, those skilled in the art would recognize that techniques shown in this application are applicable to more than just the specific embodiments shown herein. For example, the applicability of the techniques shown herein broadly encompasses a wide variety of distinct types of devices, apps, programming techniques, user interfaces, and otherwise, associated with creating and maintaining apps that can be designed, or otherwise, for different languages (or other user differences, as described herein).

Other and further techniques, also shown or suggested by this Application, are also applicable to more than just the specific embodiments described herein.

DETAILED DESCRIPTION OF AN EMBODIMENT

Terminology

Generality of the Description

Figure 1:
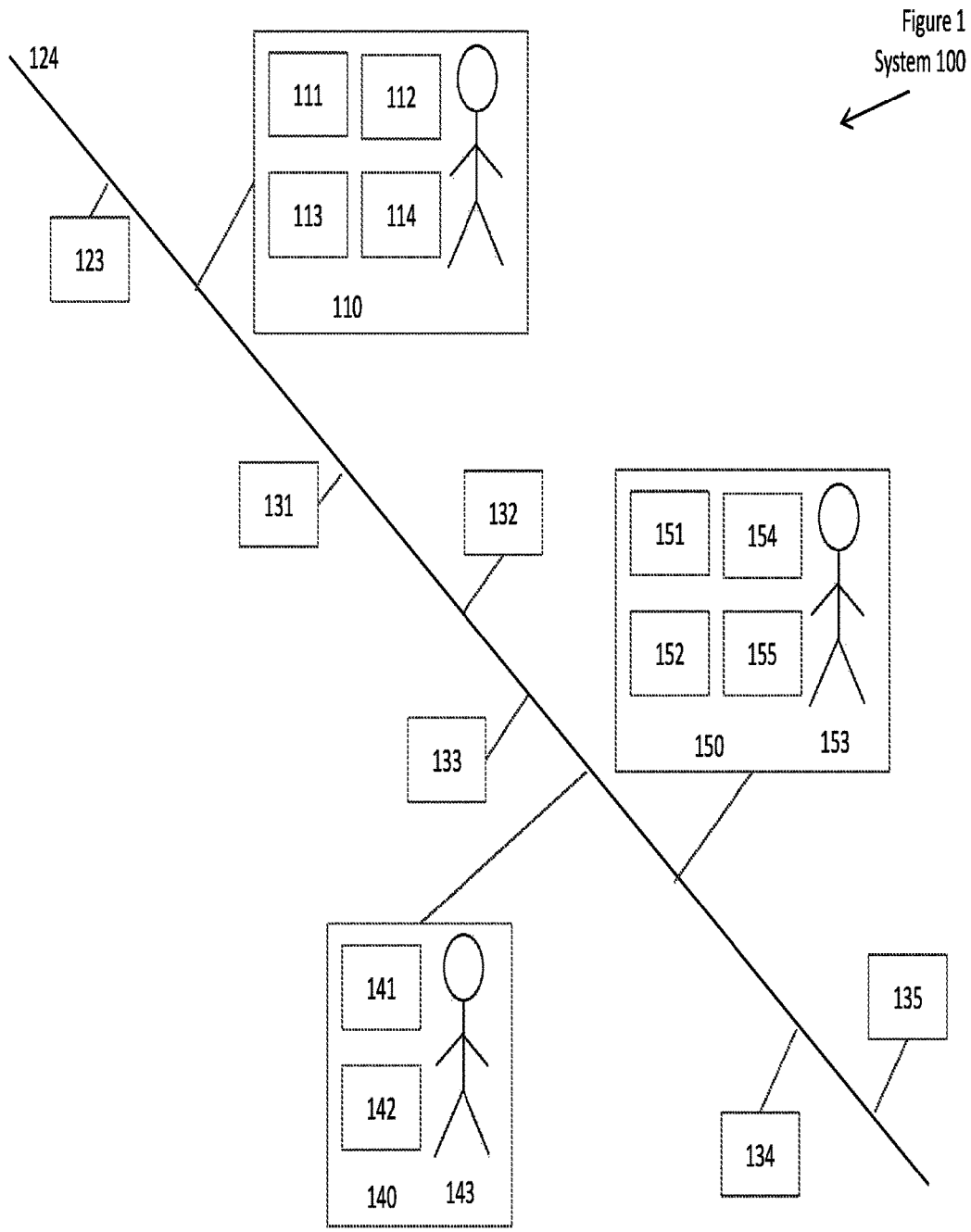
FIG. 1 shows a conceptual drawing of a system, and a method of making the same.

Ideas and technologies shown or suggested by this Application should be thought of in their most general form, including without limitation, considering one or more of the following:

The phrases and terms "Application," "this Application," "this Disclosure," and variants thereof, generally refer to this Specification, Drawings, Figures, and Claims, all other parts of this Application, and all facts known in the art at the time of filing, and all facts that can be rationally concluded therefrom.

When an apparatus element or a method step is said to "include" or "perform," and variants thereof, or otherwise be restricted in some way, this Application should be read that the subpart of the apparatus element, or the sub-step of the method, and the restriction mentioned, is only optional, not required. After reading this Application, those skilled in the art would recognize that those apparatus elements or method steps need not necessarily include or perform those particular subparts or sub-steps. In the context of the invention, no such particular subparts or sub-steps are particularly required. In alternative embodiments, apparatus elements or method steps without those subparts or sub-steps would be workable, are within the scope and spirit of the invention, and would not require undue experiment or further invention.

The phrases and terms "in one example," "in one embodiment," "in one implementation," "in one scenario," "in possible examples," "in possible embodiments," "in possible implementations," "in possible scenario," and variants thereof, generally reference that a particular characteristic, feature, or structure, described herein is included in at least one embodiment of the invention. Multiple uses of this phrase do not necessarily all refer to the same embodiment. Rather, the specific particular characteristic, feature, or structure, described herein might be combined in any suitable manner into one or more distinct possible embodiments.

The phrases and terms "perform," and variants thereof, generally refer (in the context of a program of instructions) to any one or more means by which method steps are conducted, or by which instructions are executed or interpreted. In contexts in which a device (such as a computing device, or a specialized device constructed to perform those instructions) performs those instructions, those instructions can be performed by any techniques appropriate to the device.

The phrase and terms "program of instructions," and variants thereof, generally refer to any collection of instructions designated or designed to be executed or interpreted by a device (whether a general device, or one specifically built for the particular purpose, as described above). The program of instructions can include techniques for input or output, such as with an operator. The program of instructions can be maintained in a single location, or in multiple locations, as appropriate to the task, or as convenient to one or more devices used to perform those instructions.

A program of instructions can be detected or interpreted at one location, and executed or its process conducted at another location. A program of instructions can be performed by a portion of a device, rather than the entire device, or by one or more devices, or by one or more portions of devices (such as one or more portions of the same device, or one or more portions of different devices, those different devices thus operating together). A program of instructions can be per-formed by an emulated device, such as a virtual machine, "sandbox" environment, or otherwise. A program of instructions can be performed in part, halted or paused or stopped, transferred to another device, in whole or in part, and possibly continued.

The phrases and terms "relatively," and variants thereof, generally refer any relationship in which a comparison is possible, including without limitation "relatively less," "relatively more," and otherwise. In the context of the invention, where a measure or value is indicated to have a relationship "relatively," that relationship need not be precise, need not be well-defined, and need not be by comparison with any particular or specific other measure or value. For one example, whenever a measure or value is "relatively increased" or "relatively more," that comparison need not be with respect to any known measure or value, but might be with respect to a measure or value held by that measurement or value at another place or time, or with respect to a measure or value commonly used in the art.

The phrases and terms "substantially," and variants thereof, generally refer any circumstance in which a determination, measure, value, or otherwise; is equal, equivalent, nearly equal, nearly equivalent, or approximately; what the measure or value is recited to be. For example, the phrases and terms "substantially all," and variants thereof, generally refer any circumstance in which all, except possibly a relatively minor amount or number, have the stated property. For example, the phrases and terms "substantially none," and variants thereof, generally refer any circumstance in which none, except possibly a relatively minor amount or number, have the stated property. For example, the phrases and terms "substantial effect," and variants thereof, generally refer any circumstance in which an effect might be detected or determined.

The phrases and terms "techniques," and variants thereof, generally refer any material suitable for description, including without limitation all such material within the scope of patentable subject matter. Whenever a method step is described, those skilled in the art would know, without further invention or undue experiment, that this application thereby also describes (1) at least a first product, such as one maintaining instructions that are interpretable by a computing device, where those instructions direct one or more devices to perform that method step; and (2) at least a second product, such as one capable of performing that method step.

The phrases and terms "user," and variants thereof, generally indicate any one or more persons, devices, software elements, or groups thereof, authorized or capable of interacting with one or more portions of a system disclosed herein, or authorized or capable of triggering one or more steps of a method disclosed herein. For example, a "user" can include one or more persons; one or more programs disposed to make requests of, and receive responses from, the system; one or more software elements disposed to control the system or method; an artificial intelligence or machine learning technique capable of interacting with the system or method; or combinations or conjunctions thereof.

Specific Phrases and Terms

One or more of the following phrases and terms can be used in this Application. Where clear from the context, they can have the meanings described herein. After reading this Application, those skilled in the art would recognize that these phrases and terms can have other, broader and further, meanings as well or instead.

Ideas and technologies shown or suggested by, or specific to, this Application should be thought of in their most general form, including without limitation, considering one or more of the following:

The phrases and terms "displayable media," and variants thereof, generally indicate any one or more elements of text, symbols, drawings, or figures or pictures thereof, still pictures, animation, movies, any other information understandable by users, or combinations or conjunctions thereof.

The phrases and terms "human meaning," and variants thereof, generally indicate any one or more concepts associated with items of displayable media. For example the English word "hot" is sometimes associated with the concepts of excess warmth, excess spiciness (such as in taste), radioactivity, or sexual attractiveness. In one embodiment, the programmer would use a separate key for each such human meaning, so that English word "hot" would be represented in the program by multiple separate database entries, such as a first "hot" ($hot_1$), a second "hot" ($hot_2$), a third "hot" ($hot_3$), and a fourth "hot" ($hot_4$). In one embodiment, if the app has multiple uses of "hot," the fact that there are multiple human meanings associated with that word can be provided by the programmer, or by the translator, or otherwise.

The phrases and terms "natural language," and variants thereof, generally indicate any language from which human meanings are found. For example, languages with human speakers; such as English, Mandarin, Navaho, and Spanish; are examples of natural languages. For another example, creoles, dialects, pidgins, and other variants of natural languages are considered "natural languages" in this Application. The phrases and terms "source language," and variants thereof, generally indicate (such as a source natural language) any language from which human meanings are found, and from which those human meanings are translated into a target language. The phrases and terms "target language," and variants thereof, generally indicate (such as a target natural language) any language to which human meanings are translated from a source language. For example, when translating displayable media from English language terms to Spanish language terms, English would be the source natural language and Spanish would be the target natural language. In cases when translation is for another purpose, such as changes in reading-level or style, the source language and target language can be the same.

The phrases and terms "primary form," and variants thereof, generally indicate any one or more sets of commands, instructions, program data, variables, or otherwise, in a primary form, where the information for that primary form is gleaned from the program of instructions used by the app. For example, a primary form can include a delimited table (such as in .CSV format or .TXT format), or a set of instructions to create such a table (such as in SQL command format). The phrases and terms "secondary form," and variants thereof, generally indicate any one or more sets of commands, instructions, program data, variables, or otherwise, in a secondary form, where the secondary form is used by the translation environment. For example, a secondary form can include instructions that present items of displayable media for translation (such as in HTML format).

The phrases and terms "translator," and variants thereof, generally indicate any one or more persons, devices, or groups thereof, capable of selecting displayable media in a target natural language, in response to displayable media in a source natural language (and possibly in response to context of that displayable media in the source natural language, other displayable media in that source natural language, the nature of the app, or otherwise) having the same or similar human meaning as the displayable media in the source natural language. For example, a translator can include a human translator, a machine translation device, or a combination or conjunction thereof. In cases when the translator includes a machine translation device, the translator can include one or more programs disposed to make requests of, and receive responses from, a server device; one or more artificial intelligences or machine learning techniques; or combinations or conjunctions thereof.

After reading this application, those skilled in the art would realize that the invention is not in any way limited to the specifics of any particular example. Many other variations are possible that remain within the content, scope and spirit of the invention, and these variations would be clear to those skilled in the art, without undue experiment or further invention.

Any terms appearing in the figures but not explicitly described in this Application should be apparent to those skilled in the art.

System Elements

FIG. 1 shows a conceptual drawing of a system, and a method of making the same.

In possible implementations, a system 100 can include elements described herein, other elements shown in the figure, and possibly other elements. Not all elements are required. Elements should be considered optional, unless otherwise specified or unless clearly obvious for operation of the system. Elements may also be embodied in one or more devices, not necessarily in only a single device.

Element Identifiers

System elements and sub-elements are sometimes described herein with respect to the following reference numbers and/or names:

100 system
110 programmers' development environment
111 development computing devices
112 development input/output devices
113 development storage device access elements
114 development communication interfaces
123 storage elements
124 communication networks
131 databases
132 tables
133 rows
134 columns
135 data elements
140 apps
141 mobile devices
142 app instructions
143 users
150 translation environment
151 translation computing devices
152 translation instructions
153 translators
154 translation communication interfaces
155 translation storage device access elements Development Environment In one embodiment, the system 100 includes a programmers' development environment 110, including one or more development computing devices 111, one or more development input/output devices 112, one or more development storage device access elements 113, and one or more development communication interfaces 114.

The development computing devices 111 can include one or more processors with program and data memory, or can be emulated, such as by one or more virtual machines. The development input/output devices 112 include one or more input elements, such as keyboards, pointing devices, voice input elements, haptic input elements (such as pressure sensors), and/or gesture recognition elements. The development input/output devices 112 can also include one or more output elements, such as visual displays, speakers, and/or haptic output elements (such as vibrating elements).

Common System Elements

In one embodiment, the system 100 includes one or more storage elements 123 and one or more communication networks 124.

The development storage device access elements 113 can include one or more device drivers coupled to at least some of the storage elements 123 (such as magnetic disk drives, magneto-optical drives, or flash drives or other static memories), and/or can include one or more communication links with logically remote storage elements 123 (such as network attached storage, storage servers, and/or otherwise).

The development communication interfaces 114 can be coupled to one or more communication networks 124, by which the development environment 110 can communicate with other devices.

In one embodiment, the storage elements 123 can include one or more databases 131, such as an SQL database. For example, each database 131 can include a set of tables 132, at least one of which can include a set of rows 133, each indicating a human meaning to be represented by an item of displayable media (such either the actual item, or a pointer to the item), and a set of columns 134, each indicating a natural language in which that human meaning is to be represented. A cross-product of a row 133 and a column 134 can indicate a data element 135, which can maintain the item of displayable media having that particular human meaning in that particular natural language.

App Environment

In one embodiment, one or more programmers can use the development environment 110 to create one or more apps 140, each being executable by one or more mobile devices 141. Each app 140 can include at least one set of app instructions 142. The instructions 142 can be interpreted by at least one particular mobile device 141. Upon interpretation, operations directed by those instructions 142 can be performed by that particular mobile device 141, with the effect that a user 143 of that particular mobile device 141 can be presented with one or more items of displayable media, in an order intended by the programmers.

In one embodiment, the app 140 can include one or more app instructions 142 that access a particular data element 135 in a particular database 131, with the effect that the user 143 is presented with the indicated item of displayable media. For example, the app 140 can include an app instruction 142 to access an SQL database, such as retrieving a particular row 133 associated with a particular human meaning (such as "thermal excess") cross-indexed with a particular column 134 associated with a particular natural language (such as English), with the effect that the database 131 responds by providing an item of displayable media (such as the text for the word "hot").

In one embodiment, the app instructions 142 can represent the SQL database using one or more SQL commands, such as the following:

Directing construction of one or more tables 132 in the database 131, including defining the columns 134 associated with each row 133 therein; and Directing insertion of one or more items of displayable media in data elements 135 defined by those rows 133 and columns 134.

These app instructions 142 need not be transformed into SQL commands. For example, the app instructions 142 could be transformed into a spreadsheet table, such as one having a row for each human meaning, and a column for each natural language with an item of displayable media associated with that spreadsheet table. When using SQL, the one or more SQL commands can also specify particular settings associated with the database 131, its tables 132, rows 133, and columns 134, and its data elements 135. For example, the following SQL commands can specify a set of phrases to be used by the app 140 (While Applicant believes this example code is accurate, it is only an example, and Applicant makes no guarantee that this code would work in all circumstances.)

```
CREATE TABLE phrases ( id NUMBER(6),
    phrase VARCHAR(4000));
INSERT INTO phrases (id, phrase) VALUES
    (1, "hot"),
    (2, "soap"),
    (3, "trash");
```

For another example, the following SQL commands would create a table that can be used with the translation environment 150, as described below, to translate from at least some English words to their Spanish equivalents. In such cases, the database created by these SQL commands has more than one column 134, such as one for each natural language.

```
CREATE TABLE phrases ( id NUMBER(6),
    key VARCHAR(4000), phrase VARCHAR(4000));
INSERT INTO phrases (id, key, phrase) VALUES
    (1, "hot", "calor"),
    (2, "soap", "lavor"),
    (3, "trash", "basura");
```

Performing (executing or interpreting) these SQL commands creates, in a database 131, a table 132 ("phrases") with three rows 133, each having three columns 134 (an id, a key, and a phrase), and having information to translate three English words ("hot," "soap," and "trash") into their Spanish equivalents ("calor," "lavor," and "basura"). The same table 132 can also be used to translate those Spanish words into their English equivalents.

In alternative embodiments, the SQL commands could create one table for each natural language:

```
CREATE TABLE EnglishPhrases ( id NUMBER(6),
    phrase VARCHAR(4000));
INSERT INTO EnglishPhrases (id, phrase) VALUES
    (1, "hot"),
    (2, "soap"),
    (3, "trash");
CREATE TABLE SpanishPhrases ( id NUMBER(6),
    phrase VARCHAR(4000));
INSERT INTO SpanishPhrases (id, phrase) VALUES
    (1, "calor"),
    (2, "lavor"),
    (3, "basura");
```

When the app 140 is performed (executed or interpreted), settings indicating what natural language to present to the user 143. If the settings indicate the English language, text or images of English words are used. If the settings indicate the Spanish language, text or images of Spanish words are used.

When the translation environment 150 is entered, as described herein, one or more translation computing devices 151 can add or change natural languages, such as by adding or changing columns 134 to the table 132.

For example, to add the French language, an additional column 134 can be added to the table 132. The SQL commands above can be rewritten to read as follows:

```
CREATE TABLE phrases ( id NUMBER(6),
    key VARCHAR(4000), phr1 VARCHAR(4000),
    phr2 VARCHAR(4000));
INSERT INTO phrases (id, key, phr1, phr2) VALUES
    (1, "hot", "calor", "chaud"),
    (2, "soap", "lavor", "savon"),
    (3, "trash", "basura", "bechets");
```

Similarly, to change the Spanish language to the French language, the Spanish language column 134 in the table 132 can be changed to a French language column 134 in the table 132. The SQL commands above can be rewritten to read as follows:

```
CREATE TABLE phrases ( id NUMBER(6),
    key VARCHAR(4000), phrase VARCHAR(4000));
INSERT INTO phrases (id, key, phrase) VALUES
    (1, "hot", "chaud"),
    (2, "soap", "savon"),
    (3, "trash", "bechets");
```

As described herein, with respect to the translation environment 150, the translator 153 would not generally be expected to make actual changes to the SQL commands themselves. Many translators 153 are not familiar with codes used for programs of instructions, such as for the app 140 and the app instructions 142. Preferably, although not necessarily, the system 100 would transform the SQL commands from their primary form (SQL) into a secondary form (such as HTML, or a variant thereof), and would send the secondary form to the translation environment 150 for presentation to the translator 153 in one or more screens similar to those presented by the app 140 to the user 143.

When presented with the one or more screens similar to those presented by the app 140 to the user 143, the translator 153 would be able to select displayable media with equivalent human meaning, in each case where the source natural language was to be translated into the target natural language. The translation environment 150 would receive the secondary form, present easily edited displayable media to the translator 153, and allow the translator 153 to alter the displayable media to translate from a source natural language to a target natural language.

The translator environment 150 is otherwise and further described herein.

App Environment

In one embodiment, the system 100 can include a translation environment 150, including one or more translation computing devices 151, each of which may or may not be similar to the development computing devices 111, and one or more translation instructions 152 interpretable thereby. Similar to the development computing devices 111, the translation computing devices 151 can include one or more processors with program and data memory, or can be emulated, such as by one or more virtual machines. The translation environment 150 can include one or more translation storage device access elements 155, similar to the development storage device access elements 113, capable of accessing the storage elements 123. The translation environment 150 can also include one or more translation communication interfaces 154, similar to the development communication interfaces 114, capable of coupling to one or more of the communication networks 124, with the effect that the translation environment can communicate with other devices.

In one embodiment, the app instructions 142 are maintained on at least one particular storage element 123. That particular storage element 123 can include those app instructions 142 that access the SQL database and that determine each particular item of displayable media the app 140 presents to the user 143. The translation instructions 152 can search for those app instructions 142 that access the SQL database. The translation instructions 152 can locate the SQL database, and rewrite the app instructions 142 from their "primary form" (as described herein), into a "secondary form" (as described herein), such as a text copy of those app instructions 142, or such as a data structure that represents those app instructions 142.

In one embodiment, the translation environment 150 can include translation instructions 152 that send the secondary form of the app instructions 142 to a translator 153, such as a human translator, a machine translation device, or a combination or conjunction thereof. The translation environment 150 can include translation instructions 152 that present the secondary form of the app instructions 142 to the translator 153. For example, the translation instructions 152 can present a text copy of the app instructions 142 in text form, or in HTML form, or in another human-readable form, to the translator 153.

The translator 153 observes the displayable media in the source natural language (and in the context in which it is presented by the app 140), determines a human meaning associated with that displayable media, selects an item of displayable media with equivalent human meaning in the target natural language, and edits the secondary form of the app instructions 142 to use the item of displayable media in the target natural language. The translator 153 sends the rewritten version of the secondary form of the app instructions 142 back to the development environment 110, which generates a rewritten version of the primary form of the app instructions 142, and inserts that rewritten version of the primary form of the app instructions 142 into the app 140, with the effect that the app 140 is then able to use the translated natural language.

Overview of a Method of Operation

Figure 2:
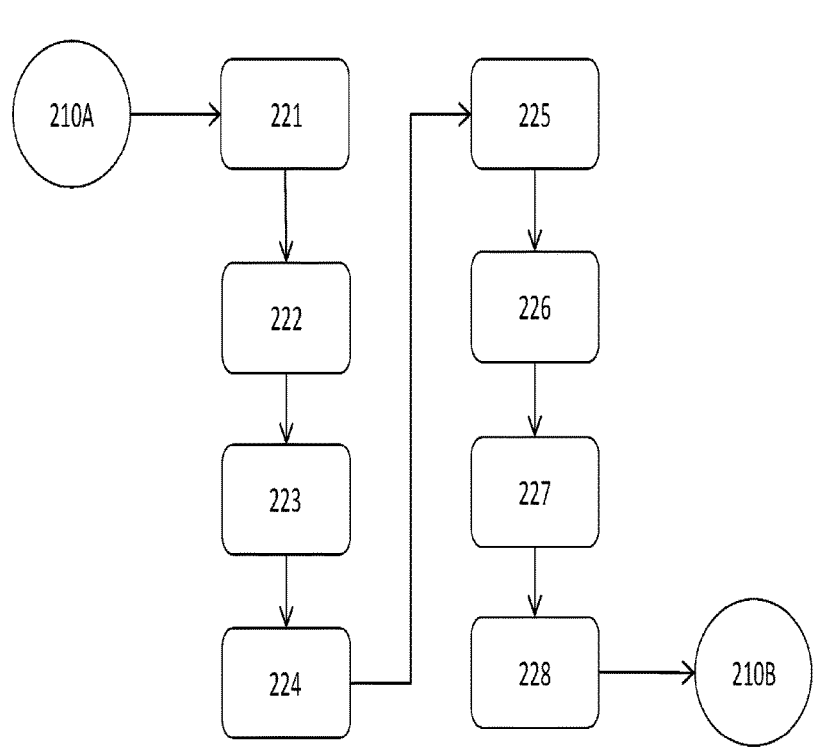
FIG. 2 shows a conceptual drawing of a method of operation, and a method of use.

FIG. 2 shows a conceptual drawing of a method of operation, and a method of use.

In possible implementations, a method 200 includes flow points and method steps as described herein, other elements shown in the figure, and possibly other elements. Not all flow points or method steps are required. Flow points or method steps should be considered optional, unless otherwise specified or unless clearly obvious for operation of the system.

The system 100, or portions of the system 100, can or be used while performing the method 200, or portions of the method 200. Where described herein that a flow point is reached, or a step is performed, by the method 200, it should be understood from the context, or from the figure, which portions (or all of them) of the system 100, reaches the flow point or takes the actions to perform the step.

Although the nature of text necessitates that the flow points and steps are shown in a particular order, in the context of the invention, there is no reason for any such limitation. The flow point may be reached, and the steps may be performed, in a different order, or may be performed by co-routines or recursive functions, or may be performed in a parallel or pipelined manner, or otherwise.

Flow Points and Method Steps

A flow point 210A indicates that the method 200 is ready to begin localization of embedded databases in an app, including translation of language text. At this flow point, the method 200 can initialize variables and reset/set the method's state, as appropriate.

At a step 221, the method 200 receives the app instructions 142 from the development environment 110, the storage elements 123, or from elsewhere. As described herein, the app instructions 142 include requests from a database, which can itself be maintained at the storage elements 123, or elsewhere.

In one embodiment, so long as the items of dis-playable media, or a database of those items, can be recognized, the app instructions 142 are (as described herein) transformed from their primary format to their secondary format, and there is no particular requirement, in the context of the invention, for what form is used by those primary or secondary formats (so long as the development environment 110 can convert between those primary or secondary formats). Moreover, so long as the items of displayable media in the secondary format can be translated, there is no particular requirement, in the context of the invention, for what method is used by the technique used by the translation environment 150, or what format the translation environment 150 returns its results in (so long as the development environment 110 can convert the translated secondary format back into the original primary format).

At a step 222, the method 200 identifies those app instructions 142 that call upon the database (in one embodiment, an SQL database) for items of displayable media, in response to settings indicating a natural language to use.

In one embodiment, the app instructions 142 can use a function such as "DO NOT TRANSLATE" to indicate those items of displayable media that should not be translated. For example, error codes or a status log should not be translated, because the programmer should be able to read them. Thus, DO NOT TRANSLATE ("error 42: life, the universe, and everything"), which returns the same string, is different from LOCALIZE ("wash your hands with soap"), which returns a translated version. Effectively the functions "DO NOT TRANSLATE" and "LOCALIZE" are hinting messages (thus, metadata) from the programmer to the translation program. The translation program also uses other techniques to determine whether or not to translate items of displayable media, such as text strings, to other languages. For example, if the item of displayable media includes the word "error," it might mean that there should be no translation performed.

At a step 223, the method 200 transforms the app instructions 142 from their primary form (as used in the app 140) into a secondary form (as used by the translation environment 150). For example, the method 200 can transform SQL commands into HTML display commands.

At a step 224, the method 200 presents the app instructions 142, in response to their secondary form, to the translator 153. For example, if the secondary form includes HTML display commands, or a variant thereof, the method 200 presents a web page, as indicated by those HTML display commands, to the translator 153.

At a step 225, the method 200 prompts the translator 153 to translate the items of displayable media in the app instructions 142 from a source natural language to a target natural language, as described herein with respect to the translation environment 150. For example, as part of this step, the translator 153 observes the displayable media in the source natural language, determines an associated human meaning, selects displayable media with equivalent human meaning in the target natural language, and edits the displayable media to use the target natural language.

At a step 226, the method 200 prompts the translator 153 to send the rewritten version of the secondary form of the app instructions 142 back to the development environment 110.

At a step 227, the method 200 prompts the development environment 110 to receive the rewritten version of the secondary form of the app instructions 142, and transforms them to an equivalent rewritten version of the primary form of the app instructions 142.

At a step 228, the method 200 prompts the development environment 110 to replace the primary form of the app instructions 142 with their the rewritten version, with the effect that the app 140 is then able to use the translated natural language. In alternative embodiments, the development environment 110 may augment the primary form of the app instructions 142 in separate lproj folders (in the case of iPhone apps) with their rewritten version. A flow point 210B indicates that the method 200 is finished. In one embodiment, the method 200 can be restarted, either with another app 140, or with another target natural language for the app 140.

Alternative Embodiments

Real-World Nature

While some embodiments are generally described herein with respect to specific steps to be performed by generalized computing devices, in the context of the invention, there is no particular requirement for any such limitation. For example, subject matter embodying the invention can include special-purpose devices; can include hardware devices having the elements described herein, and having the effect of performing the steps described herein; and combinations and/or conjunctions thereof. Embodiments of the invention are not necessarily limited to computing devices, but can also include any form of device or method that can improve techniques for improving the effect of the machine operations described herein.

Similar Elements or Steps

Individual elements or method steps of the described embodiments could be replaced with substitutes that perform similar functions in other contexts.

Elements of the system are described herein with respect to one or more possible embodiments, and are not intended to be limiting in any way. In the context of the invention, there is the particular requirement for any such limitations as described with respect to any elements of the system. For one example, individual elements of the described apparatuses could be replaced with substitutes that perform similar functions. Moreover, as described herein, many individual elements of the described apparatuses are optional, and are not required for operation.

Moreover, although control elements of the one or more described apparatuses are described herein as being executed as if on a single computing device, in the context of the invention, there is no particular requirement for any such limitation. For one example, the control elements of the one or more described apparatuses can include more than one computing device (or more than one specialized computing device), not necessarily all similar, on which the element's functions are performed.

For one example, while some embodiments are generally described herein with respect to specific steps to be performed by generalized computing devices, in the context of the invention, there is no particular requirement for any such limitation. In such cases, subject matter embodying the invention can include special-purpose devices; and can include special-purpose hardware devices having the elements described herein, and having the effect of performing the steps described herein; and combinations and/or conjunctions thereof. Embodiments of the invention are not necessarily limited to computing de-vices, but can also include any form of device or method that can improve techniques for improving the effect of the machine operations described herein.

In one particular implementation, instructions capable of being interpreted for control of devices can be provided as a computer program product, such as instructions that are maintained on a computer-readable storage medium or a non-transitory machine-readable medium. The non-transitory medium can include a magnetic, optical or magneto-optical storage medium; a flash storage medium; and/or otherwise.

Specification Not Limiting

After reading this Application, those skilled in the art would recognize that the invention is not limited to only the specifically described embodiments, that many variations are within the scope and spirit of the invention, and would be workable without undue experiment or further invention.

Claims Included in Specification

The Claims in this Application are hereby included by reference in the text of the Specification.

The invention claimed is:
1. Apparatus including
an application program (app) development device including instructions interpretable to develop an app suitable for execution on a mobile device, and program elements in the app having a first format presenting displayable media to a user when using the app, in a first presentation natural language, and a second format presenting displayable media to a translator when the translator adds a second presentation natural language, the program elements providing at least one localization database; wherein said app combined with said localization database provides an app providing output in at least a first natural language;

instructions rewriting the program elements in the app from the first format into the second format, providing said displayable media in a human readable format to a translator station, the human readable format including the context of presenting displayable media to a user when using the app, in the first presentation natural language, and sending the displayable media to the translator station;

said translator station interpreting instructions to present said human-readable format to a translator in the context of presenting displayable media to a user when using the app, and to accept editing input from said translator in the context of presenting displayable media to a user when using the app, revising said human-readable format into a second natural language without substantial change in human meaning; and instructions in response to said input from said translator, providing revision instructions to alter the program elements in the app, to direct those program elements to include said second natural language in said localization database, and to direct those program elements to provide a revised localization database.

2. Apparatus as in claim 1, wherein
after having received said app, said mobile device is decoupled from said app development device.

3. Apparatus as in claim 2, wherein
said display and editing instructions receive simulated outputs from said app, in a format sufficiently different from said localization database that said app cannot read said simulated outputs.

4. Apparatus as in claim 1, wherein said app
accesses at least a portion of said revised localization database;
includes instructions interpretable by said mobile device to select a natural language in which to present output.

5. Apparatus as in claim 1, wherein
said app includes instructions accessing at least a portion of said revised localization database,
said portion of said revised localization database is maintained external to said mobile device.

6. Apparatus as in claim 1, wherein
said translator station, in response to said display instructions, presents simulated outputs from said app to said translator at said translator station, in a format substantially identical to said app at said mobile device.

7. Apparatus as in claim 1, wherein
said translator station, in response to said editing instructions, revises content described by said human-readable format to include at least said second natural language;
at least one result of revising including
simulated outputs from said app presented to said translator at said translator station, in a format substantially identical to said app at said mobile device, but in said second natural language.

8. Apparatus as in claim 6, wherein
said translator station, in response to said display instructions, presents said simulated outputs in said second natural language;
said translator station, in response to said editing instructions, further revises said content in said second natural language.

9. A method, including steps of
in a development environment for at least one application program (app) suitable for execution on a mobile device, searching said app for program elements having a first format presenting displayable media to a user when using the app, in a first presentation natural language, the program elements providing at least one localization database including a set of displayable media outputs in a first natural language;

converting program elements in the app from the first format into a second format, the second format presenting displayable media to a translator when the translator adds a second presentation natural language, and presenting said displayable media in a human-readable format to a translation station in the same context as presenting displayable media to a user when using the app;

from said translation station in the same context as displayable media is presented to a user when using the app, receiving a revised human-readable format that includes content describing said outputs in a second natural language;

providing and executing instructions to alter the program elements in the app, to direct those program elements to include said second natural language in said localization database, and to direct those program elements to provide a revised localization database, in response to said revised human-readable format.

10. A method as in claim 9, including steps of
at said mobile device, accessing at least a portion of said revised localization database;
selecting therefrom at least one natural language in which to present output.

11. A method as in claim 6, including steps of
at said mobile device, accessing at least a portion of said revised localization database;
wherein
said revised localization database is external to said mobile device.

12. A method as in claim 9, including steps of
at said translator station, presenting simulated outputs from said app to said translator at said translator station, in a format substantially identical to said app at said mobile device.

13. A method as in claim 9, including steps of
at said translator station, receiving simulated outputs from said app, in a format sufficiently different from said localization database that said app cannot read said simulated outputs.

14. A method as in claim 9, including steps of decoupling said mobile device from said app development device after receiving said app.

15. A method as in claim 9, including steps of
revising said human-readable format to include at least said second natural language;
providing simulated outputs from said app, in a format substantially identical to said app at said mobile device, but in said second natural language.

16. A method as in claim 15, including steps of
further revising said human-readable format and providing further revised output in said second natural language;
wherein said further revised output has a human meaning substantially identical to said first natural language.

17. A method, including steps of
searching instructions, that when interpreted at a mobile device provide an application program (app) said instructions defining program elements in the app having a first format presenting displayable media to a user when using the app, in a first natural language, and a second format presenting displayable media to a translator when the translator adds a second presentation natural language, for a localization database;

rewriting the program elements in the app from the first format into the second format, and providing said displayable media in a human-readable format suitable for a translator to observe without software able to read said localization database, the human readable format including the context of presenting displayable media to a user when using the app, in the first presentation natural language, and sending the displayable media to the translator station, with substantially identical output from a simulation of said app;

receiving input from said translator in response to presenting the displayable media in the same context as to a user when using the app, suitable to revise said simulation to provide, in a second natural language, output with substantially identical human meaning, in the same context as to a user when using the app;

in response to said input, providing instructions to revise said localization database to alter the program elements in the app, to direct those program elements to provide a revised app with output in at least said second natural language, and executing said instructions to provide said revised app.

18. A method as in claim 17, wherein said localization database includes a set of tables, each having rows and columns representing languages and phrases;

said human-readable format includes a web client presentation language that encodes output from a simulation of said app in said first natural language;

said simulation is editable by said translator using an unenhanced web client to provide a revised simulation in said second natural language in said web client presentation language;

said instructions to revise said localization database, responsive to edits to said web client presentation language, provide new rows or columns representing said second natural language.

19. A method as in claim 17, wherein said steps of searching instructions are responsive to output instructions with metadata describing whether those outputs are intended to be translated.

* * * * *